United States Patent [19]
McCabe et al.

[11] Patent Number: 5,597,772
[45] Date of Patent: Jan. 28, 1997

[54] THERMALLY STABLE RHODIUM/ALUMINA CATALYSTS

[75] Inventors: Robert W. McCabe, Lathrup Village; Rengin K. Usmen, Troy; Harendra S. Gandhi, Farmington Hills, all of Mich.

[73] Assignee: Ford Motor Company, Dearborn, Mich.

[21] Appl. No.: 370,139

[22] Filed: Jan. 9, 1995

[51] Int. Cl.⁶ .................................................. B01J 23/56
[52] U.S. Cl. ........................ 502/332; 502/325; 502/355; 423/213.5
[58] Field of Search ................................ 502/332, 325, 502/355; 423/213.5

[56] References Cited

U.S. PATENT DOCUMENTS

| | | | |
|---|---|---|---|
| 2,620,314 | 12/1952 | Hoekstra | 252/448 |
| 4,172,047 | 10/1979 | Gandhi et al. | 252/466 PT |
| 4,526,886 | 7/1985 | Joy, III | 502/339 |
| 4,717,781 | 1/1988 | Imai et al. | 585/441 |
| 4,904,633 | 2/1990 | Ohata et al. | 502/304 |
| 5,266,548 | 11/1993 | Koradia et al. | 502/439 |

*Primary Examiner*—Shrive Beck
*Assistant Examiner*—Timothy H. Meeks
*Attorney, Agent, or Firm*—Lorraine S. Melotik; Roger L. May

[57] ABSTRACT

The invention relates to a method of making a rhodium containing phase of a catalyst system useful to treat the exhaust gases of an internal combustion engine. The method comprises hydrothermally pre-treating the alumina prior to its impregnation with a preferably low loading of rhodium. Preferably the alumina is α-alumina.

4 Claims, 4 Drawing Sheets

TEMPERATURE (K)

THERMALLY STABLE RHODIUM/ALUMINA CATALYSTS

TECHNICAL FIELD

This invention relates to a method for making a three-way catalyst phase comprising rhodium on alumina, being preferably, alpha-alumina, which includes hydrothermally pre-treatment the alumina before loading with a low level of rhodium.

BACKGROUND OF THE INVENTION

Three way catalysts are used in internal combustion engine exhaust systems, e.g., automotive exhaust systems, to convert the carbon monoxide, hydrocarbons and nitrogen oxides present in automotive exhaust gases into more desirable components. A wide variety of catalysts have been used including rhodium carried on an alumina support material. Rhodium is particularly effective for controlling emissions of nitrogen oxides (i.e. $NO_x$) and is generally used in combination with other noble metals (e.g., Pt or Pd) to effect the full range of exhaust pollutant control. In practice, rhodium is often segregated from the other noble metals in the same catalyst by dispersing it in a separate washcoat layer or within the same washcoat layer but upon a different support phase. One of the drawbacks of such a catalyst is that it has a tendency to become deactivated at high temperatures particularly in oxidizing gas mixtures. Rhodium interacts strongly with gamma-alumina at high temperatures above 500° C. but α-alumina was found to interact only weakly with rhodium after oxidizing treatments up to 900° C. as disclosed in U.S. Pat. No. 4,172,047, which patent is commonly assigned with the present invention.

Other problems related to the deactivation of rhodium and other noble metals are 1) loss of alumina surface area and associated occlusion of noble metal particles, and 2) sintering or coalescence of small noble metal particles into larger particles. It would be desirable to further minimize the interactions between rhodium and alumina, while simultaneously decreasing the extent of rhodium occlusion and sintering. The present invention has been found to meet these objectives.

SUMMARY OF THE INVENTION

This invention is a method for making a thermally stable rhodium-containing phase of a catalyst system for treating exhaust gases from an internal combustion engine, which comprises the steps of:
providing a substrate;
providing a support material of alumina;
subjecting the alumina to a steam-air mixture for at least 24 hours at a temperature of at least 950° C. to hydrothermally pre-treat the alumina, and
impregnating the alumina support material with rhodium to form the rhodium containing phase of the catalyst system. Preferably, the alumina is α-alumina, and the rhodium is provided on the α-alumina in an amount less than about 1.0 μ-mole rhodium/$m^2$ based on the α-alumina. Preferably, the rhodium containing phase is subject to calcining.

Another embodiment is the catalyst system made by the method disclosed above.

DETAILED DESCRIPTION OF PREFERRED EMBODIMENTS

Figure 1:
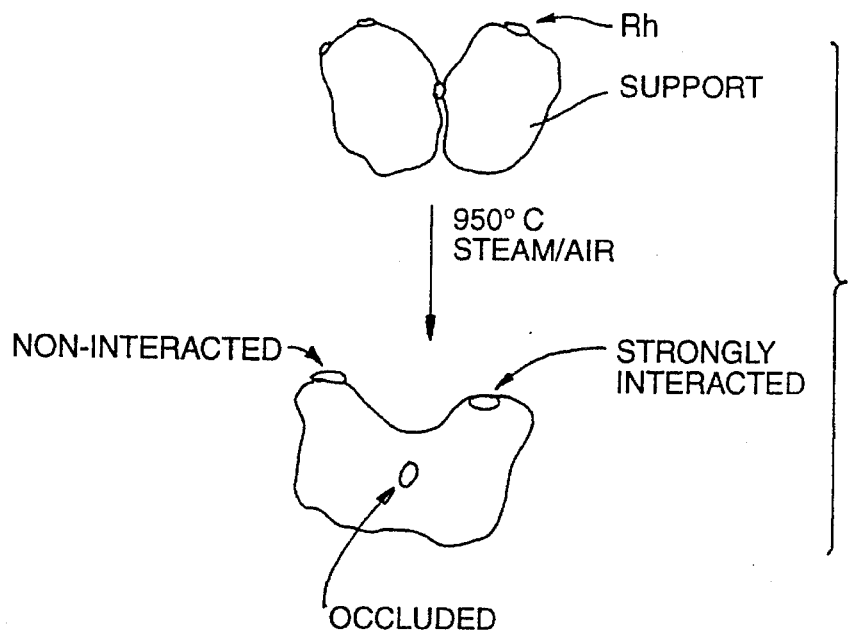
FIG. 1 is a schematic illustration of the hydrothermal deactivation mechanisms of a rhodium/$Al_2O_3$ catalyst.

This invention discloses a method for preparing a catalyst of alumina impregnated with rhodium which includes hydrothermally pre-treating the alumina, preferably being α-alumina, before providing rhodium on the alumina. This hydrothermal pre-treatment of the alumina minimizes deactivation of the rhodium which may take place by chemical or physical interaction between the rhodium and the alumina. The rhodium becomes deactivated by several mechanisms as illustrated in FIG. 1. One involves chemical interaction of the rhodium catalytic material with the alumina, another involves encouraging several small rhodium particles to grow into large particles which have substantially less catalytic surface area than the total of the small particles. Still another involves the degradation of the alumina pore structure which causes occlusion of the rhodium particles and hence blocks their catalytic activity. Overall the object of retaining catalytic activity of the rhodium involves maintaining a high dispersion (i.e., surface area exposure) of rhodium on the alumina substrate.

Figure 2:
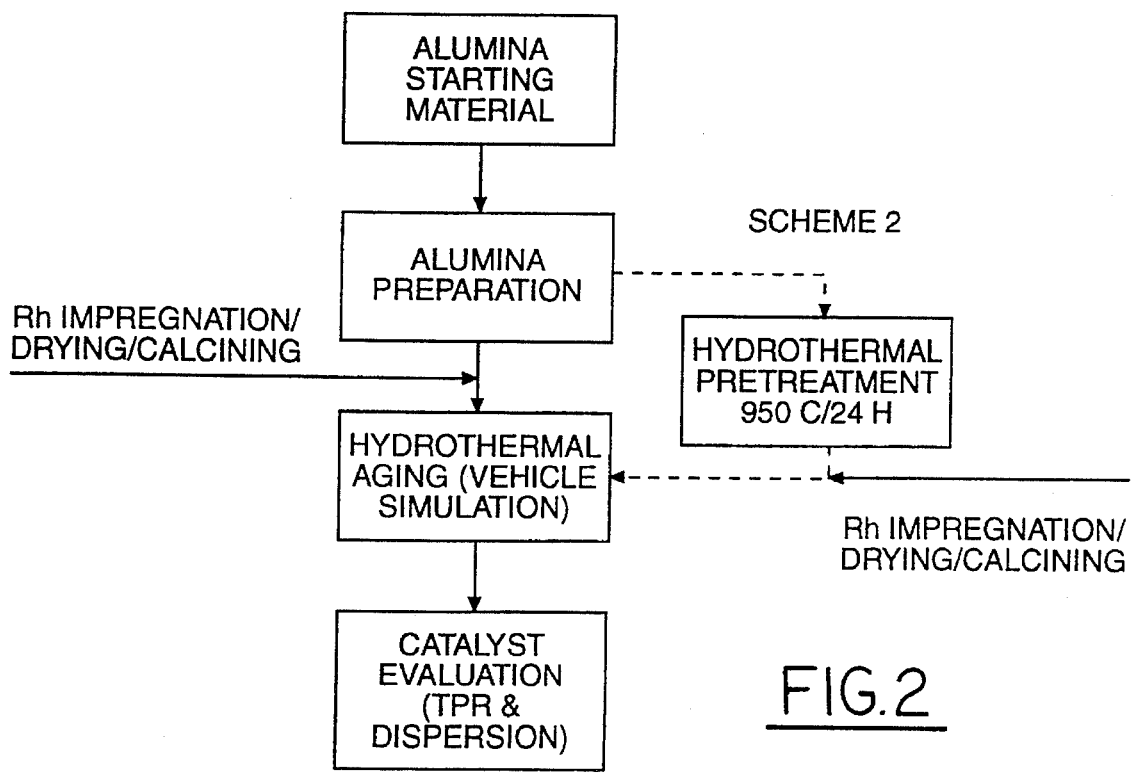
FIG. 2 schematically illustrates two schemes for making and testing a catalyst, Scheme 1 being for a comparative catalyst embodiment not according to the present invention and Scheme 2 being a catalyst embodiment according to the present invention which involves the pre-treatment hydrothermal aging of the alumina.

According to the present invention, a substrate for the catalyst system is selected. The substrate may be of the general type known, such as a monolithic ceramic substrate, a monolithic metallic substrate, or pelletized catalytic substrate. Embodiments of two schemes for preparing catalysts are shown in FIG. 2. In Scheme 1 a comparative catalyst scheme is illustrated for catalyst not according to the present invention. It involves the preparation of Rh/$Al_2O_3$ catalysts and their thermal aging and evaluation. Scheme 2, in contrast, illustrates embodiments of rhodium/$Al_2O_3$ catalysts prepared according to the present invention (and also their thermal aging and evaluation). The critical difference is that the present invention involves a hydrothermal pre-treatment of the alumina before impregnation thereof with rhodium.

In both catalyst schemes, a variety of aluminas can be employed and if desired subjected to further preparation as shown in FIG. 2. Such preparation would be desirably used to convert a non-alpha-alumina to the optimal alpha-alumina. As can be seen from FIG. 2, in Scheme 2, the alumina is subjected to a hydrothermal pre-treatment prior to application of the rhodium. The hydrothermal pre-treatment of the alumina according to the present invention can be carried out on the alumina while it is in powder form prior to it being washcoated on the substrate material or after it has been washcoated. In one embodiment, the substrate is washcoated with a desired alumina, which is preferably alpha-alumina.

As is known to those skilled in the art, alpha-alumina may be prepared, e.g., by air calcination of a transitional alumina phase (e.g. gamma, delta, or theta). Preferably the alpha-alumina is prepared from a relatively high surface area transitional phase alumina (BET area of approximately 90–100 $m^2/g$) by suitable techniques as would be apparent to those skilled in the art in view of the present disclosure. For example, a suitable starting material is comprised of, but not limited to, a flame hydrolyzed alumina (predominantly delta phase) as is available from Degussa Corp. under the designation Type-C. According to such techniques, the starting alumina is then optimally defumed and subsequently calcined in a muffle furnace at temperatures and times sufficient to decrease the surface area to ca. 10 $m^2/g$ and reveal only alpha alumina phases in X-ray powder diffraction. A suitable time for effecting such a transition is 4 hours at 1150° C.

For simplicity of explanation herein, the alumina will be taken to have been washcoated on the substrate. As discussed above, however, the invention is not so limited. The amount of alumina provided on the substrate is not critical to the invention. Desirably in the case of alpha-alumina support material, for example, 10–30% by weight based on the weight of the substrate is provided.

Next, according to the present invention, the alumina is subjected to a steam-air mixture hydrothermal pre-treatment treatment. This pre-treatment (i.e., prior to impregnating with rhodium) comprises heating the alumina powder material in a flowing stream of steam-air mixture for at least 24 hours and at a temperature of at least 950° C., preferably between about 950° and 1000° C. and for a time between 24 and 60 hours. The period of hydrothermal treatment generally will depend mainly upon temperature. The ratio of water/air is not critical. In one example, an alpha-alumina support was subjected to 10% water (volume fraction) in flowing air (200 cc/min.) at 950° C. for twenty-four hours. This treatment time and temperature may be varied but most optimally is selected to preferably produce a final BET surface area of about 5 $m^2/g$ of the alumina.

According to the present invention, the pre-treated alumina, preferably being in the alpha-phase, is subsequently impregnated with rhodium. If the pre-treatment has been carried out on a powder, the impregnation of the alumina can be carried out either before or after the treated alumina is applied to the aforementioned catalyst substrate. That is, the rhodium can be applied to the alumina either when it is in powder form or after the alumina is washcoated onto the catalyst substrate. In the case of Scheme 1 comparative example, the impregnation by rhodium would take place onto non-hydrothermally treated alumina.

As described above, once a suitable alumina material is obtained, rhodium is applied to the alumina. Preferably, and particularly when the alumina is preferred alpha-alumina, the alumina is impregnated with rhodium in an amount less than about 1.0 µ-mole rhodium per square meter of said alumina. Preferably the rhodium is present in the range from about 0.3 µ-mole rhodium/$m^2$ to about 1.0 µ-mole rhodium/$m^2$. This range corresponds to a weight percent loading of about 0.02% to 0.07%, respectively. Various methods are known in the art for impregnation of rhodium into a washcoat. One particularly preferred way involves dissolving rhodium nitrate in a dilute aqueous solution, combining with the alumina powder, and evaporating the excess solution to dryness. Still other methods will be apparent to those skilled in the art in view of the present disclosure.

After impregnation of rhodium on the alumina, for testing and evaluation purposes the catalysts prepared according to both Scheme 1 and Scheme 2 of FIG. 1 are generally subjected to "hydrothermal aging" to mimic in use conditions of such catalysts. This is not to be confused with hydrothermal pre-treatment as in this invention. The method for hydrothermal aging to be employed is not critical but generally would be similar to that described in detail above for the pre-treatment.

Unexpectedly we have found that as a result of the hydrothermal pre-treatment of the alumina prior to providing rhodium thereon according to the present invention, the invention rhodium/alumina catalyst is thermally stable. This is shown in the examples below made according to embodiment of the present invention (as in Scheme 2 embodiments) when contrasted with similar catalysts made however without the pre-treatment step as in Scheme 1.

The thermally stable rhodium/alumina catalyst of the present invention, as disclosed herein, is intended to serve as a component phase within the framework of a fully formulated automotive catalyst. For example, one may make a catalyst system based on rhodium and platinum in which the rhodium to platinum ratio could be anywhere from about 1 to 4 to 1 to 17, the latter ratio being reflective of the ratio at which the two elements are mined from some South African reefs. Preferably at least a part of the rhodium would be contained separately on the aforementioned alpha-alumina support materials while the platinum, and perhaps part of the rhodium would be contained on a separate washcoat phase also containing various support stabilizers and modifiers commonly used in automotive catalysis.

EXAMPLE 1

This example refers to the preparation of a catalyst designated D-1 by the sequence of steps along the lines of Scheme 1 (comparative example) of FIG. 2:

Alumina starting material was prepared from Degussa C-type flame hydrolyzed alumina powder. This material is predominantly delta(δ)-phase alumina as received, with a BET surface area of 90–100 $m^2/g$. The alumina was first defumed by mixing it with water and slowly evaporating the water while stirring at room temperature for a couple of days. After the water was evaporated to the point where the mixture could not be stirred, it was further dried, in cake form, at 120° C. and then calcined in a muffle furnace at 550° C. for 5 hours. The dried, calcined δ-phase material is the alumina starting material which is useful for making catalysts following both Scheme 1 and Scheme 2.

A portion of the δ-alumina starting material was then heated in air in a muffle furnace at a temperature of 600° C. for 4 hours. This is the material obtained after the step labeled "Furnace Aging" in Scheme 1 of FIG. 2. X-ray analysis of the alumina after the 600° C. heat treatment revealed diffraction lines predominantly characteristic of δ-alumina, essentially unchanged from the starting alumina material.

Rhodium was next added to the furnace-aged alumina. A 14 g sample of furnace-aged alumina was mixed with an aqueous solution of rhodium nitrate ($Rh(NO_3)_3 \cdot 2H_2O$) containing a total of 0.085 grams of rhodium. The mixture was first dried at room temperature, then at 100° C., and subsequently calcined at 550° C. for 4 hours. The process outlined above constitutes the rhodium impregnation/drying/calcining step according to Scheme 1 of FIG. 2 (comparative example). The catalyst at this point was in the so-called "fresh" state, designated D-1, with a Rh loading of 0.6 wt %.

EXAMPLE 2

This example describes the properties of a series of fresh catalysts prepared according to the general outline of Scheme 1 (comparative examples):

Table 1 summarizes pre-treatment conditions for a series of ten catalysts prepared on aluminas from three sources. Samples D-1 through D-7 were prepared on the Degussa C-type alumina described in Example 1. Sample A-8 was prepared on alumina obtained from Alcoa, Inc. The Alcoa alumina was a high surface area α-alumina (approximately 100 m²/g BET area). Samples E-9 and E-10 were obtained from Engelhard Corporation and were nominally γ-aluminas which had been precalcined to surface areas of 62 and 21 m²/g, respectively.

TABLE 1

Summary of Sample Pretreatments

| Sample | Sample i.d. | Rh wt % | Alumina Pretreatment | Alumina Phase |
|---|---|---|---|---|
| Degussa C δ-Al₂O₃ | D-1 | 0.60 | 873 K 4 hr | δ-Al₂O₃ |
|  | D-2 | 0.54 | 1173 K 4 hr | δ-Al₂O₃ |
|  | D-3 | 0.51 | 1273 K 4 hr | δ-Al₂O₃ |
|  | D-4 | 0.48 | 1373 K 4 hr | δ/θ-Al₂O₃ |
|  | D-5 | 0.20 | 1373 K 8 hr | α/θ-Al₂O₃ |
|  | D-6 | 0.05 | 1373 K 24 hr | α-Al₂O₃ |
|  | D-7 | 0.07 | 1423 K 4 hr | α-Al₂O₃ |
| Alcoa α-Al₂O₃ | A-8 | 0.07 | 1173 K 4 hr | α-Al₂O₃ |
| Engelhard Al₂O₃ | E-9 | 0.39 | 1323 K 4 hr | θ/α-Al₂O₃ |
|  | E-10 | 0.13 | 1343 K 4 hr | α/θ-Al₂O₃ |

Prior to impregnating with rhodium, the aluminas were optimally subjected to a variety of furnace aging conditions (not hydrothermal pre-treatment) being summarized in the column labeled "alumina pre-treatment" in Table 1. These furnace agings differed greatly in severity and effected a range of phase transitions in the alumina materials. The alumina phases are summarized in the last column of Table 1. In the case of mixed phases, the phase listed first was the most abundant. In general, as the severity of the pre-treatment increases (i.e. higher temperatures and/or longer times) the aluminas follow a transformation that proceeds from delta to theta to alpha phases. The phases that precede the alpha phase are known as transitional phases because they are metastable in the thermodynamic sense. The alpha phase is the thermodynamically stable phase of alumina.

The change in alumina phase structure effected by the aging of each starting alumina was accompanied by a corresponding change in the surface area of each material. These data are summarized in column 3 of Table 2 under the heading "fresh". In the terminology employed in the present invention, the term "fresh," when applied to materials aged by Scheme 1, refers to an alumina which has been furnace-aged at conditions listed in Table 1 and then impregnated with Rh as outlined in Example 1. The BET area does not change measurably as a result of impregnation, drying and calcination of the Rh. Thus the decreases in BET area listed in Table 2 for the fresh samples are a direct reflection of the severity of the alumina pre-treatment (i.e. furnace aging). The steam aged (hydrothermally aged samples of the table) were subjected to a 10% water/air steam aging for 24 hours at 950°.

TABLE 2

BET Surface Area, Rh Loading, and Dispersion of Fresh and Steam Aged Samples (Scheme 1 aging)

| Sample | Rh Loading (wt %) | BET Surface Area (m²/g) | | Dispersion (%) | |
|---|---|---|---|---|---|
|  |  | fresh | steam aged | fresh | steam aged |
| D-1 | 0.60 | 96.6 | 77.0 | 65.2 | 4.5 |
| D-2 | 0.54 | 86.6 | 75.9 | 62.8 | 5.2 |
| D-3 | 0.51 | 82.1 | 73.4 | 56.1 | 5.2 |
| D-4 | 0.48 | 76.4 | 56.6 | 58.7 | 4.9 |
| D-5 | 0.20 | 32.7 | 14.6 | 42.4 | 3.3 |
| D-6 | 0.05 | 8.4 | 6.6 | 48.7 | 10.1 |
| D-7 | 0.07 | 11.3 | 7.2 | 57.1 | 9.9 |
| A-8 | 0.07 | 10.4 | 6.4 | 53.2 | 5.2 |
| E-9 | 0.39 | 62.0 | 40.0 | 37.9 | 2.6 |
| E-10 | 0.13 | 21.0 | 10.0 | 41.6 | 1.0 |

The rhodium loadings for each sample are given in both Table 1 and Table 2. All of the catalysts were loaded at a constant loading of 0.6 μ-mole Rh/m²(BET). Thus, the loading as a weight percent of the alumina was decreased in proportion to the decrease in BET area of the fresh alumina samples.

The fresh rhodium/Al₂O₃ samples were also characterized by a carbon monoxide chemisorption technique, which effectively titrates the fraction of rhodium atoms that are accessible to gas phase molecules and not covered either by other rhodium atoms or by the alumina support. These results are summarized under the column labeled "Dispersion" in Table 2. Dispersion is another term for the fraction of accessible rhodium atoms; it is used when expressing the fraction in terms of a percentage. Table 2 shows that all of the fresh catalysts had dispersions that fell in the range from 38–65% with no clear correlation between dispersion and BET area.

EXAMPLE 3

This example describes the properties of a series of hydrothermally aged catalysts prepared according to the general outline of Scheme 1:

The series of fresh catalyst samples described in Example 2 were subjected to a 24 hour aging in a retort oven in a purge stream of 200 cm³/min of 10% steam in air at a temperature of 950° C. The purpose of the steam/air aging (identified as hydrothermal aging in FIG. 2) was to simulate high temperature aging conditions in automotive exhaust which typically contains 10–12% water vapor.

Subsequent to the hydrothermal aging, the BET areas and rhodium metal dispersions of the catalysts were remeasured. These data are presented in Table 2 under the columns designated "steam aged." Note that in all cases, both the BET area and the dispersion decreased after the hydrothermal aging treatment. Two major observations can be made from the Dispersion and BET data:

1) Catalysts D-6 and D-7 retained rhodium dispersions that were at least twice, and in some cases, as much as 10 times greater than the other samples;

2) Even catalysts such as D-6, for which the starting alumina had been pre-treated in air at temperature/time conditions more severe than the subsequent hydrothermal aging, showed more than a 20% decrease in BET area as a result of the hydrothermal aging.

EXAMPLE 4

This example shows the effectiveness of catalyst preparation according to Scheme 2 for increasing the amount of active rhodium after 950° C. thermal aging of the D-1 catalyst:

As noted in the Background material and illustrated in FIG. 1, high-temperature aging of rhodium/$Al_2O_3$ catalysts is generally accompanied by three modes of deactivation (i.e. loss of accessible rhodium reaction sites): 1) interaction with the underlying alumina support, 2) occlusion of rhodium particles by collapse of the alumina pores, and 3) sintering (i.e. coalescence) of smaller rhodium particles to form larger rhodium particles.

A portion of the furnace aged D-1 alumina starting material (as described in Example 1) was subjected to the 950° C. hydrothermal pre-treatment of Scheme 2 in FIG. 2 prior to impregnation with rhodium at a loading (0.6 μ-moles/$m^2$(BET)) equivalent to that employed for the corresponding D-1 catalyst prepared according to Scheme 1. The two D-1 catalysts were then subjected to a hydrothermal aging treatment at 950° C. to simulate aging in automotive exhaust. After aging, both catalysts were evaluated by BET area measurements, hydrogen temperature-programmed reduction, and dispersion measurements in such a way as to determine the fractions of rhodium in each sample deactivated by the three mechanisms noted above.

Figure 3:
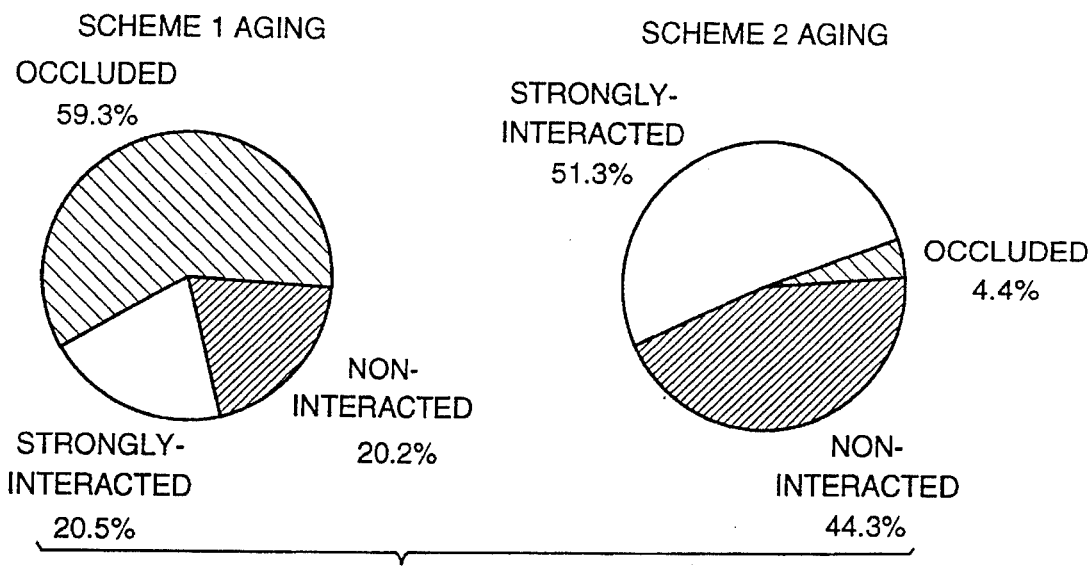
FIG. 3 illustrates the distribution of rhodium in example D-1 catalysts prepared according to Schemes 1 and 2.

FIG. 3 shows the breakdown for the D-1 catalyst prepared by Scheme 1 and Scheme 2, respectively. The most striking difference between catalysts is that Scheme 2 hydrothermal pre-treatment virtually eliminated the occlusion of rhodium caused by partial collapse of the alumina pore structure. Almost 60% of the rhodium in the Scheme 1 prepared D-1 sample was occluded after hydrothermal aging versus only about 4% in the Scheme 2 prepared sample after a similar hydrothermal aging. The BET area of the Scheme 1 sample was 97 $m^2$/g before hydrothermal aging and 77 $m^2$/g after hydrothermal aging. In contrast, the Scheme 2 sample had a starting BET area of 82 $m^2$/g after hydrothermal pre-treatment which decreased to 76 $m^2$/g after hydrothermal aging. Thus Scheme 2 pre-treatment resulted in proportionally much less loss of surface area and associated occlusion of rhodium than in the catalyst prepared according to Scheme 1.

As a result of less rhodium occlusion for the Scheme 2 D-1 catalyst, more rhodium interacted with the support (51% vs 21% for the Scheme 1 catalyst). Despite this, the amount of non-interacted rhodium in the Scheme 2 catalyst was more than double the amount in the Scheme 1 catalyst (44% vs 21%). Only a small fraction of the non-interacted rhodium, in both cases, ended up as surface atoms (i.e. accessible to gas phase molecules). However, the overall effect of the Scheme 2 hydrothermal pre-treatment was to preserve 6.1% of the starting rhodium as surface atoms versus only 4.5% for the Scheme 1 catalyst; in other words, a 35% increase in the amount of catalytically active rhodium in the case of the Scheme 2 pre-treatment.

EXAMPLE 5

Figure 4A:
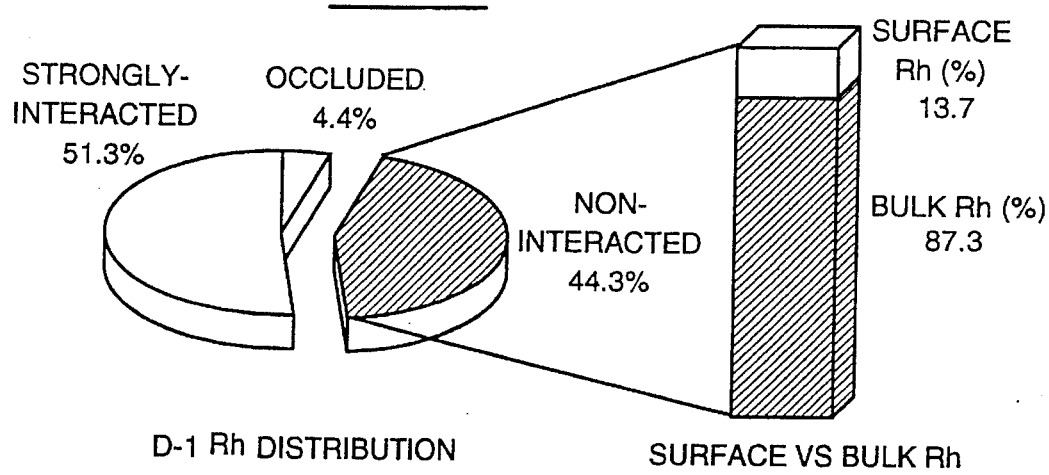
FIGS. 4A and 4B illustrate the distribution of rhodium in embodiment catalyst examples according to the present invention, example D-1 (FIG. 4A) and example D-7 (FIG. 4B), both being prepared with the hydrothermal pre-treatment.
Figure 4B:
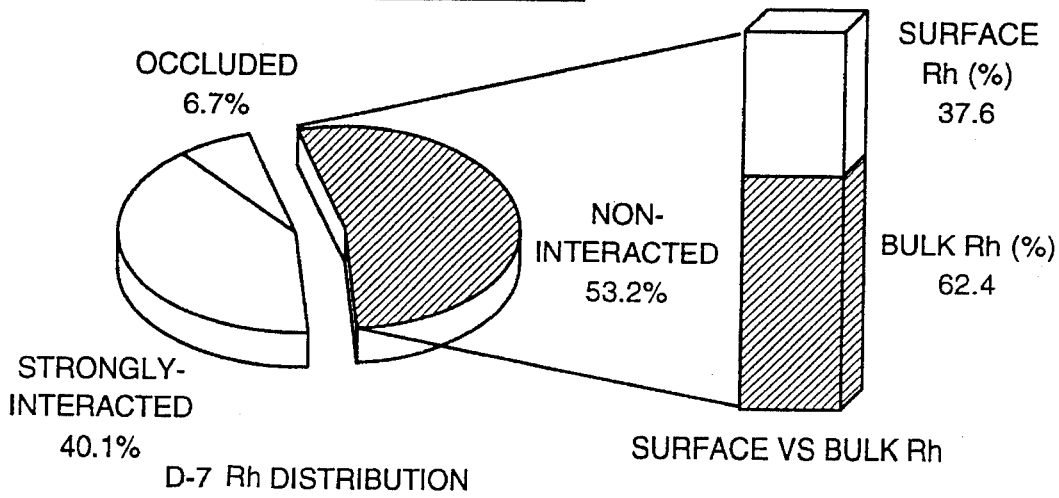

This example illustrates the performance advantage that is obtained by combining the Scheme 2 hydrothermal pre-treatment procedure with the use of alpha-alumina as a support material:

FIG. 4A shows the rhodium distribution in the D-1 catalyst and FIG. 4B shows the rhodium distribution in the D-7 catalyst after preparing the catalysts by Scheme 2 and subjecting them to hydrothermal aging. The D-7 catalyst (prepared on alpha-alumina) had a greater amount of non-interacted rhodium (53% vs 44%). Moreover, about 38% of the rhodium in the non-interacted phase was in the form of surface rhodium atoms vs only 14% in the case of the D-1 catalyst (prepared on delta-alumina). Overall, the Scheme 2 D-7 catalyst retained 20% of the starting rhodium in the form of surface rhodium atoms, whereas the Scheme 2 D-1 catalyst only retained about 6% of the starting rhodium in the form of surface rhodium atoms.

Figure 5A:
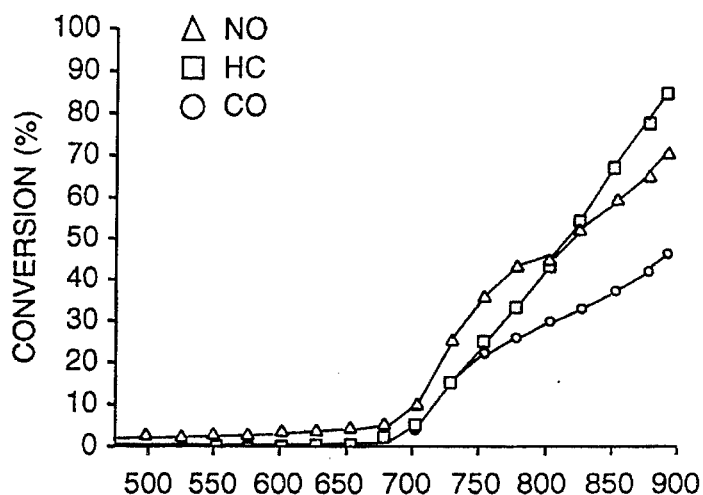
FIGS. 5A and 5B are graphs illustrating conversion vs. temperature plots for the hydrothermally aged example D-1 (Scheme 1) shown in FIG. 5A and (b) D-7 (Scheme 2) catalysts.
Figure 5B:
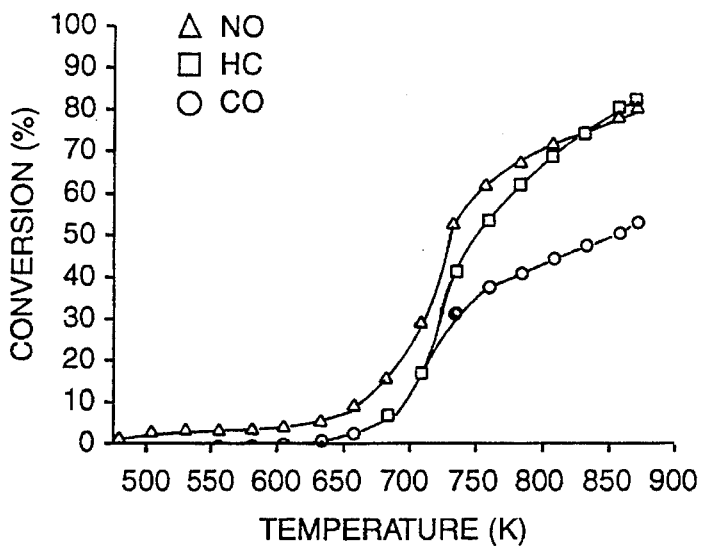

Catalytic reactivity tests were made on the Scheme 1 prepared D-1 catalyst and on the Scheme 2 prepared D-2 catalyst to assess the benefits of combining Scheme 2 preparative methods with the use of alpha-alumina as a support material. Experiments were carried out in a laboratory bench reactor employing simulated automotive exhaust gas. The catalysts were evaluated in the "light-off" mode, i.e. under conditions representing the transient heating of a catalytic converter from ambient temperature to its warmed up operating temperature. FIGS. 5A and 5B show conversion profiles for carbon monoxide (circles), hydrocarbons (squares), and nitric oxide (triangles) as a function of catalyst temperature for both the hydrothermally aged D-l(Scheme 1) (FIG. 5A) and D-7(Scheme 2) (FIG. 5B) catalysts. The experiments were carried out at identical mass amounts of rhodium in the reactor which required diluting the more heavily loaded D-1 catalyst with nearly a ten-fold excess of blank alumina. Temperatures of 50% conversion were significantly lower for the D-7 catalyst than for the D-1 catalyst. Especially for nitric oxide conversion (the chief function of rhodium in an automotive catalyst), the combined effects of employing alpha alumina as a support material and preparing the catalyst by Scheme 2 resulted in a 50% conversion temperature of 450° C. (723 K) for the D-7 catalyst vs. 520° C. (793 K) for the D-1 catalyst. The 50% conversion temperature is a standard measure of automotive catalyst efficiency. A lower 50% conversion temperature generally translates into a shorter time requirement for the catalyst to reach its maximum efficiency.

EXAMPLE 6

Figure 6:
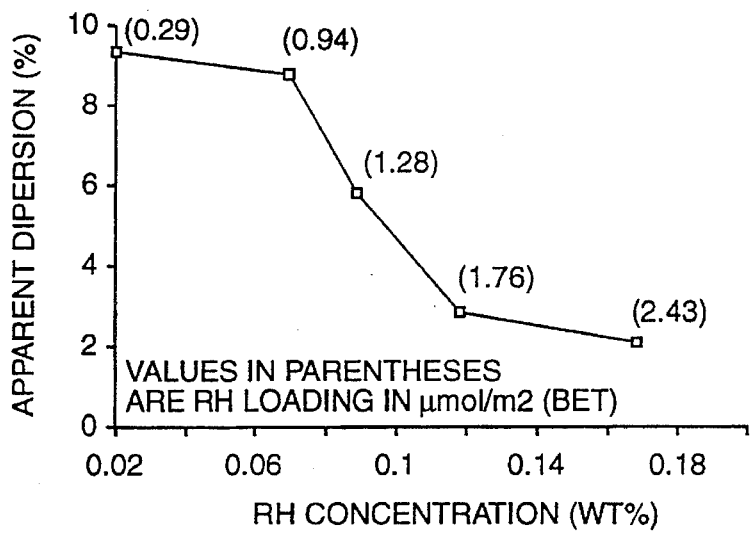
FIG. 6 is a graph illustrating the effect of rhodium loading on the apparent dispersion after hydrothermal aging.

This example shows the benefit of loading rhodium on alpha-alumina at a loading of less than 1.0 μ-mole/$m^2$ (BET):

A series of rhodium catalyst samples of varying rhodium loading were prepared on the D-7 alpha-alumina which had been made by furnace aging the Degussa C-type alumina at 1150° C. for 4 hours. The catalyzed samples were hydrothermally aged at 950° C. for 24 hours to simulate aging in automotive exhaust. A strong effect of rhodium loading was noted as evidenced in FIG. 6. At rhodium loadings greater than about 1.5 μ-mole/$m^2$(BET), the apparent rhodium dispersion after hydrothermal aging was 3% or less. At loadings less than 1.5 μ-mole/$m^2$(BET), the apparent rhodium dispersion after hydrothermal aging rose sharply to levels near 10% and remained relatively constant with decreasing rhodium loading. Thus a maximum rhodium loading of about 1 μ-mole/$m^2$(BET) is defined, below which apparent dispersions ca. 10% can be obtained even after severe high temperature hydrothermal aging.

EXAMPLE 7

Figure 7:
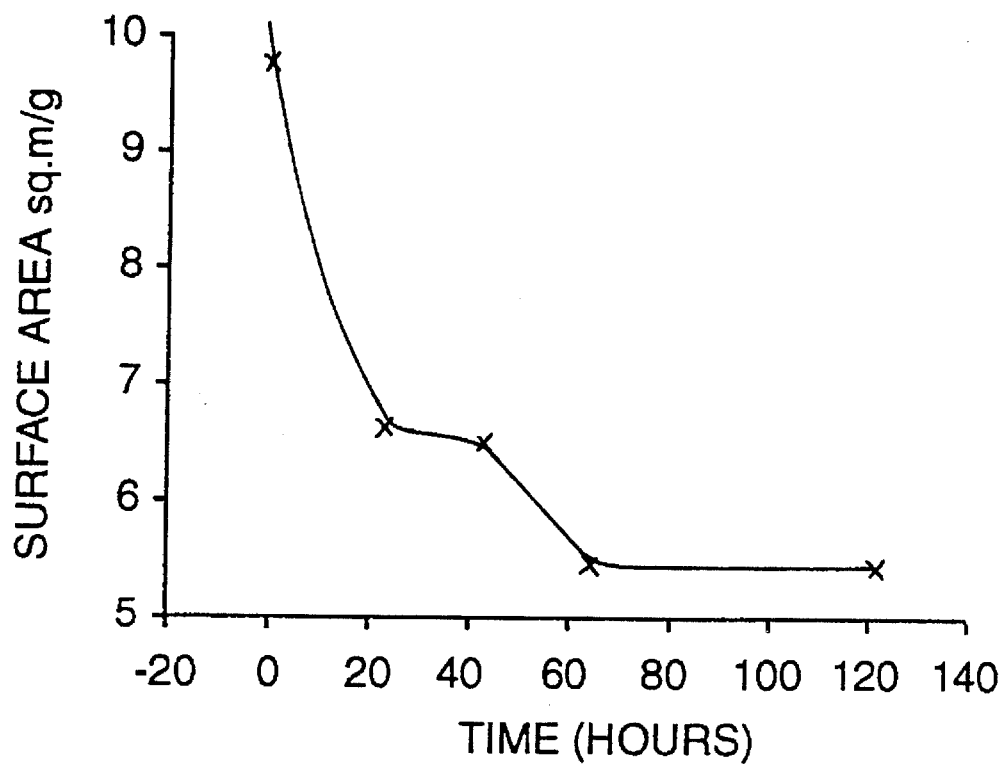
FIG. 7 is a graph illustrating the effect of hydrothermal pre-treatment at 950° C. for various times on the BET area of the D-7 alumina.

Samples of the D-7 alpha-alumina material were subjected to hydrothermal pre-treatment in a 10% steam/air flowing mixture at 950° C. for various times. The aged samples were analyzed by BET surface area measurement and by X-ray diffraction (XRD). XRD showed no crystalline phases other than that of alpha-alumina for all of the samples including the starting (i.e. zero-hour) D-7 material. The BET surface area, however, decreased with aging time as shown in FIG. 7. The starting material had about 10 $m^2/g$ BET area, which decreased rapidly in the first twenty-four hours of aging to about 6.6 $m^2/g$. Surface area loss was much more gradual at longer times, and samples aged for 66 hours versus 125 hours showed no significant difference in BET area, both lining out at about 5.5 $m^2/g$.

We claim:

1. A method for making a thermally stable rhodium-containing phase of a catalyst system for treating exhaust gases from an internal combustion engine, which comprises steps of:

providing a substrate, providing a support material of α-alumina;

subjecting said α-alumina to a steam-air mixture for at least 24 hours at a temperature of at least 950° C. to hydrothermally pre-treat said α-alumina, and impregnating said α-alumina support material with rhodium.

2. The method according to claim 1 wherein said rhodium is provided on said α-alumina in an amount less than about 1.0 μ-mole rhodium/$m^2$ based on the α-alumina.

3. A method for making a thermally stable rhodium/alumina catalyst for treating exhaust gases from an internal combustion engine, which comprises steps of:

providing a substrate, providing a support material consisting essentially substantially of α-alumina;

subjecting said alumina to a steam-air mixture for at least 24 hours at a temperature of at least 950° C. to hydrothermally pre-treat said alumina, and impregnating said α-alumina support material with rhodium in an amount less than about 1.0 μ-mole rhodium/$m^2$ based on the α-alumina.

4. A rhodium containing phase of a catalyst system made according to the method of claim 1.

* * * * *